3,364,249
N-CARBOXYALKYL-PHENOXYALKANOIC ACID AMIDE

William A. Bolhofer, Frederick, Pa., assignor to Merck & Co., Inc., Rahway, N.J., a corporation of New Jersey
No Drawing. Filed Jan. 30, 1964, Ser. No. 341,421
8 Claims. (Cl. 260—471)

ABSTRACT OF THE DISCLOSURE

Phenoxyalkanoic acid amides and anilinoalkanoic acid amides which are substitued at the amido nitrogen by a carboxyalkyl radical. The benzene nucleus in the resulting product may be unsubstituted or may contain one or more halo, nitro, alkyl, cycloalkyl, alkenyl, alkoxy, alkylthio, alkysulfonyl, amido or aryl substituents or may be substituted by a divalent hydrocarbylene chain. The products are hypocholesterolemic agents which are useful in the treatment of atherosclerosis.

The instant products are synthesized by treating an appropriate phenoxyalkanoic acid halide or anilinoalkanoic acid halide with a suitable carboxyalkylamine.

---

This invention relates to a new class of N-carboxyalkyl-phenoxyalkanoic acid amides and N-carboxyalkyl-anilinoalkanoic acid amides which possess valuable hypocholesterolemic acitvity and which are thuse useful in the treatment of atherosclerosis.

The novel amides of the invention are compounds having the following structural formula:

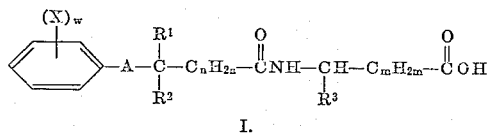

I.

wherein A is a member selected from the group consisting of oxygen and imino, $R^1$ and $R^2$ each represents a member selected from the group consisting of hydrogen, lower alkyl, e.g., methyl, ethyl, isopropyl, etc., halo-lower alkyl, e.g., chloromethyl, trifluoromethyl, 2,2,2-trifluoroethyl, etc. and, taken together, the $R^1$ and $R^2$ radicals may be joined to form a cycloalkyl ring, for example a cycloalkyl ring containing from 5–6 nuclear carbon atoms, such as cyclopentyl, cyclohexyl, etc., $R^3$ is a member selected from the group consisting of hydrogen, lower alkyl, e.g., methyl, ethyl, propyl, etc., lower alkylthioalkyl, e.g., methylthioethyl, ethylthioethyl, etc. and aralkyl, e.g., benzyl, etc., X is a member selected from the group consisting of hydrogen, halogen, e.g., chlorine, bromine, fluorine, etc., nitro, alkyl, e.g., lower alkyl, such as methyl, ethyl, propyl, butyl, etc., cycloalkyl, e.g., cycloalkyl containing from 5–6 nuclear carbon atoms, such as cyclopentyl, cyclohexyl, etc., alkenyl, e.g., lower alkenyl, such as vinyl, allyl, etc., alkoxy, e.g., lower alkoxy, such as methoxy, ethoxy, propoxy, etc., lower alkylthio, e.g., methylthio, etc., lower alkylsulfonyl, e.g., methylsulfonyl, etc., aryl, e.g., phenyl, tolyl, xylyl, etc., aralkyl, e.g., benzyl, para-methylbenzyl, phenethyl, etc., aralkoxy, e.g., benzyloxy, phenethyloxy, etc., arylcarbonylmethyl, e.g., phenylcarbonylmethyl, etc., arylamino, e.g., anilino, N-methylanilino, etc., lower alkanoic acid amido, e.g., acetamido, etc. and, taken together, two of the X radicals on adjacent carbon atoms of the benzene nucleus may be joined to form a hydrocarbylene chain (i.e., a divalent organic radical composed solely of carbon and hydrogen) containing from 3–4 carbon atoms between their points of attachment, for example, trimethylene, i.e., $-CH_2-CH_2-CH_2-$, tetramethylene, i.e., $-CH_2-CH_2-CH_2-CH_2-$, 1,3-butadienylene, i.e., $-CH=CH-CH=CH-$, etc., $m$ represents an integer having a value of 0–3, $n$ represents an integer having a value of 0–4 and $w$ represents an integer having a value of 0–3.

This invention also relates to the acid addition salts of the instant N-carboxyalkyl-phenoxyalkanoic acid amides and N-carboxyalkyl-anilinoalkanoic acid amides, which salts are prepared by the reaction of the said amides with a base having a non-toxic, pharmacologically acceptable cation. In general, any base which will form an acid addition salt with a carboxylic acid and whose pharmacological properties will not cause an adverse physiological effect when ingested by the body system is considered as being within the scope of this invention. Suitable bases thus include, for example, the alkali metal and alkaline earth metal hydroxides, carbonates, etc., ammonia, primary, secondary and tertiary amines, such as monoalkylamines, dialkylamines, trialkylamines, nitrogen containing heterocyclic amines, e.g., piperidine, etc. The acid addition salts thus produced are the functional equivalent of the corresponding alkanoic acid products and one skilled in the art will appreciate that to the extent that the alkanoic acids of the invention are useful in therapy, the variety of acid addition salts embraced by this invention are limited only by the criterion that the bases employed in forming the salts be both nontoxic and physiologically acceptable.

This invention also relates to the ester and amide derivatives of the instant products; which derivatives are prepared by conventional methods well-known to those skilled in the art. Thus, for example, the ester derivatives may be prepared by the reaction of an N-carboxyalkyl-phenoxyalkanoic acid amide or N-carboxyalkyl-anilinoalkanoic acid amide of this invention with an alcohol as, for example, with a lower alkyl alcohol to prepare the corresponding esterified derivative or alternatively, converting the N-carboxyalkyl-phenoxyalkanoic acid amide or N-carboxyalkyl-anilinoalkanoic acid amide to its acid halide by conventional methods and treating the acid halide thus formed with an appropriate lower alkanol. The ester derivatives of the products of the invention may also be prepared inherently during the process by substituting the appropriate ester analog for the corresponding aminoalkanoic acid reactant of the process hereinafter disclosed and conducting the reaction in a manner otherwise similar to that employed for the preparation of the products per se. The amide derivatives of the instant products may be prepared by treating the acid halide of the said products with ammonia or an appropriate dialkylamine to produce the corresponding amide. Another process for preparing the said amide derivatives comprises the conversion of the products of the invention to their corresponding ester derivatives and treating the said ester with ammonia or an appropriate dialkylamine to produce the corresponding amide compound. These and other equivalent methods for the preparation of the ester and amide derivatives of the instant products will be apparent to one having ordinary skill in the art and to the extent that the said derivatives are both non-toxic and physiologically acceptable to the body system the said esters and amides are the functional equivalent of the corresponding alkanoic acid products.

A preferred class of N-carboxyalkyl-phenoxyalkanoic acid amides according to this invention include the 4-halo- and 4-lower alkyl-phenoxyisobutyric acid amides of the following formula:

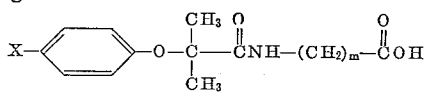

wherein the radical X represents a member selected from the group consisting of halogen, e.g., chlorine, etc. and lower alkyl, e.g., methyl, ethyl, propyl, butyl, etc., and $m$ represents an integer having a value of 1–3. Also included within the preferred embodiment are the acid addition salts, esters and amide derivatives of the N-carboxyalkyl-phenoxyisobutyric acid amides described above; for example, the alkali metal and alkaline earth metal salts thereof, such as the sodium, potassium or calcium salts, the lower alkyl esters thereof, for example, the corresponding ethyl, propyl, or butyl esters and the corresponding amide derivatives of the above-described compounds, for example, the di-lower alkylamido derivatives, such as dimethylamido, diethylamido, etc.

The N-carboxyalkyl-phenoxyalkanoic acid amides and N-carboxyalkyl-anilinoalkanoic acid amides of the invention are conveniently prepared by the reaction of a suitable nuclear substituted or nuclear unsubstituted phenoxyalkanoic acid halide or anilinoalkanoic acid halide with an appropriate aminoalkanoic acid in the presence of a base, e.g., an aqueous soluton of sodium hydroxide. The following equation illustrates the reaction:

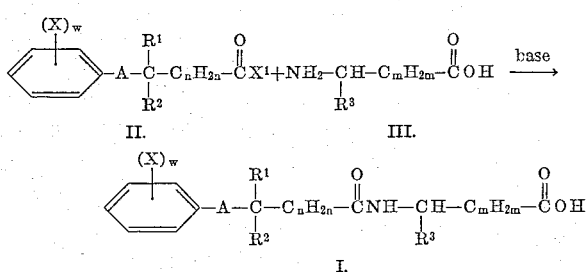

wherein the radicals A, $R^1$, $R^2$, $R^3$, X, $m$, $n$ and $w$ are as defined above and $X^1$ represents halogen, e.g., chlorine, bromine, etc. The reaction solvent and the temperature at which the reaction is conducted are not particularly critical aspects of the invention. However, I have found that a mixture of tetrahydrofuran and water is a particularly suitable solvent in which to conduct the reaction and that the reaction proceeds most advantageously with slight heating.

The phenoxyalkanoic acid halide reactant, identified as compound II in the above equation, is prepared by the halogenation of the corresponding carboxylic acid. Suitable halogenating agents include, for example, thionyl chloride, phosphorus trichloride and phosphorus oxychloride. A modification of the said acid halide synthesis consists in first forming the corresponding sodium salt of the phenoxyalkanoic acid and reacting the said salt with phosphorus oxychloride, phosphorus trichloride or thionyl chloride to produce the desired phenoxyalkanoic acid halide.

The alkanoic acid starting materials from which the acid halide reactants (II) are produced may be synthesized by methods well known to those skilled in the art. Thus, when the radical A represents oxygen and $R^1$ and $R^2$ represent hydrogen or lower alkyl, the corresponding phenoxyalkanoic acids are prepared by the reaction of an alkali metal phenoxide with a lower alkyl ester of a haloalkanoic acid in a basic solution and the resulting ester derivative thus formed is hydrolyzed in the presence of an acidic medium to generate the desired carboxylic acid. The following equation illustrates this process:

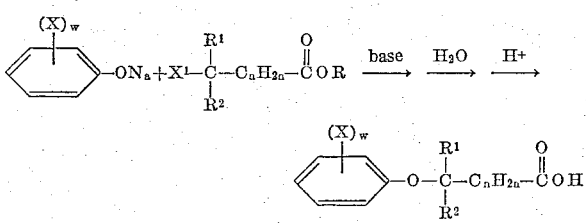

wherein the radicals X, $X^1$, $n$ and $w$ are as defined above, R represents a lower alkyl group, $R^1$ and $R^2$ each represent a member selected from the group consisting of hydrogen, lower alkyl and halo-lower alkyl and $H^+$ represents the cation of an organic or inorganic acid, e.g., hydrochloric acid.

Those alkanoic acid starting materials wherein the radical A represents nitrogen and $R^1$ and $R^2$ represent a member selected from the group consisting of hydrogen and lower alkyl may be prepared by the hydrolysis of an appropriate anilino substituted alkanoic acid amide or anilino substituted alkyl nitrile, as shown by the following equation:

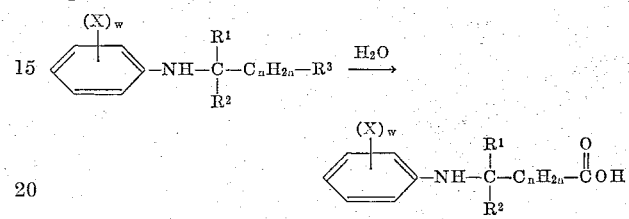

wherein the radicals $R^1$, $R^2$, X, $n$, $w$ and $H^+$ are as defined above and $R^3$ represents a member selected from the group consisting of cyano (i.e., —CN) and amido (i.e.

$-CNH_2$)

The alkanoic acid reactants wherein $R^1$ and $R^2$ are combined to form a cycloalkyl ring are prepared by the reaction of an appropriate nuclearly substituted or nuclearly unsubstituted phenol or aniline with cyclohexanone or cyclopentanone and chloroform in the presence of a strong base. Suitable bases include, for example, sodium hydroxide or potassium hydroxide:

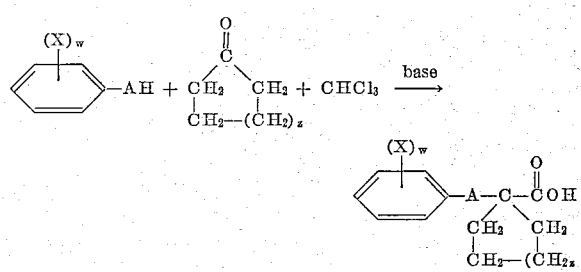

wherein the radicals A, X and $w$ are as defined above and $z$ is an integer having a value of 1–2.

There is no clear agreement about the actual role of cholesterol synthesis in the localization of atherosclerotic plaques, but numerous studies support the concept that cholesterol plays a major role in the pathogenesis of atherosclerosis because along with other liquids and fibrin it is the substance that accumulates in the arterial intima and subintima and produces arterial corrosion.

Since cholesterol is present to some extent in all ordinary diets and since it is also synthesized by various body organs from intermediates of metabolic origin, the development of some chemotherapeutic agent which will induce a significant reduction in the serum cholesterol level has been found desirable. To this end the N-carboxyalkyl-phenoxyalkanoic acid amides and N-carboxyalkyl-anilinoalkanoic acid amides of this invention were tested and found to exhibit good hypocholesterolaemic activity. Thus, in a comparison with other known compounds the instant products compare most favorably in protecting against induced hypercholesterolaemia and combine the unexpected advantage of low toxicity with little or no undesirable side effects. Furthermore, the products of this invention have shown themselves to be metabolically more acceptable than many other chemotherapeutic agents used in the treatment of atherosclerosis and may be taken orally as part of a diet with good ingestion by the body system. For this purpose the compounds of this invention may be administered in the form of a pharmacologically acceptable acid addition salt and in admixture with a pharmaceutical carrier.

The following examples are illustrative of the N-carboxyalkyl-phenoxyalkanoic acid amides of the invention and the method by which they may be prepared. The examples are illustrative only and the invention should not be construed as being limited thereto.

*Example 1.—N-carboxymethyl-2-(4-chlorophenoxy)-2-methylpropionamide*

*Step A.—2-(4-chlorophenoxy)-2-methylpropionyl chloride.*—A solution of 21.5 g. (0.1 mole) of 4-chlorophenoxyisobutyric acid and 24 ml. of thionyl chloride in 200 ml. of benzene is heated under reflux for 1½ hours. The benzene is removed by vacuum concentration by means of a water aspirator. 50 ml. of benzene is added to the residue and the solution is again concentrated. The residue obtained is identified as 2-(4-chlorophenoxy)-2-methylpropionyl chloride.

*Step B.—N-carboxymethyl - 2 - (4-chlorophenoxy)-2-methylpropionamide.*—A 500 ml. three-necked flask equipped with a stirrer and two dropping funnels is charged with 7.5 g. (0.1 mole) of glycine and a solution of 4 g. (0.1 mole) of sodium hydroxide in 200 ml. of water. A solution of the 2-(4-chlorophenoxy)-2-methylpropionyl chloride obtained in Step A is dissolved in 75 ml. of tetrahydrofuran and is placed in one of the dropping funnels and a solution of 4 g. (0.1 mole) sodium hydroxide in 75 ml. of water is placed in the other dropping funnel. The two solutions are added at the same rate to the stirred glycine solution at a temperature of 5–10° C. The time required for addition is one hour and then stirring is continued for a second hour at 25° C. The reaction is acidified with concentrated hydrochloric acid to a pH of 4 and extracted with ether. The ether solution of the product is washed with water, dried with magnesium sulfate and evaporated in vacuo to 75 ml. Addition of petroleum ether gives 19.3 g. (72%) of a white solid identified as N-carboxymethyl-2-(4-chlorophenoxy)-2-methylpropionamide which melts at 108–112° C. Recrystallization from 200 ml. of butyl chloride gives 17.6 g. of N-carboxymethyl-2-(4-chlorophenoxy) - 2 - methylpropionamide melting at 114–116° C.

*Example 2.—N-ethoxycarbonylmethyl-2-(4-chlorophenoxy)-2-methylpropionamide*

A solution of 2.0 g. (0.05 mole) of sodium hydroxide in 20 ml. of water is added to a solution of 6.95 g. (0.05 mole) of glycine ethyl ester hydrochloride in 100 ml. of water in a 300 ml. flask equipped with a stirrer and two dropping funnels. A solution of 2-(4-chlorophenoxy)-2-methylpropionyl chloride (11.6 g., 0.05 mole) in 30 ml. of tetrahydrofuran is added from one of the dropping funnels while a solution of 2.0 g. (0.05 mole) of sodium hydroxide in 20 ml. of water is added simultaneously from the other dropping funnel. These reagents are added over a half hour period during which time the temperature of the reaction is maintained at 5–10° C. The reaction is then stirred overnight at room temperature.

The reaction product is extracted with ether, the extract is washed with water, dried with magnesium sulfate and then concentrated under reduced pressure. The residual oil is distilled at 0.4 mm. to obtain 7.0 g. (47%) of N-ethoxycarbonylmethyl - 2 - (4-chlorophenoxy)-2-methylpropionamide, boiling at 165° C.

*Example 3.—N-[2-methyl-2-(4-chlorophenoxy)propionyl]-DL-methionine*

A solution of 3.74 g. (0.025 mole) of DL-methionine and 1 g. (0.025 mole) of sodium hydroxide in 50 cc. of water is stirred and cooled at 5° C.

To the cooled solution is added, alternately, with stirring over a period of one hour 5.8 g. (0.025 mole) of 2-(4-chlorophenoxy)-2-methylpropionyl chloride in 20 cc. of tetrahydrofuran and a solution of 1 g. (0.025 mole) of sodium hydroxide in 20 cc. of water over one hour.

After stirring one additional hour the solution is acidified with hydrochloric acid and extracted with ether. The ethereal solution is dried and evaporated to a viscous oil which is then dissolved in butyl chloride and crystallized by cooling in a dry ice-acetone bath. The product is then recrystallized from butyl chloride to obtain 3.2 g. of N-[2-methyl - 2-(4-chlorophenoxy)-propionyl]-DL-methionine, M.P. 82–83.5° C.

By substituting the appropriate phenoxyalkanoic acid halide reactant (II) and glycine derivative (III) for the 2-(4-chlorophenoxy)-2-methylpropionyl chloride and glycine of Example 1, Step B and following substantially the procedure described therein, the corresponding N-carboxyalkylphenoxyalkanoic acid amide products are prepared. The following equations and accompanying table depict the reaction described in the foregoing example and illustrate the starting materials and final products produced thereby:

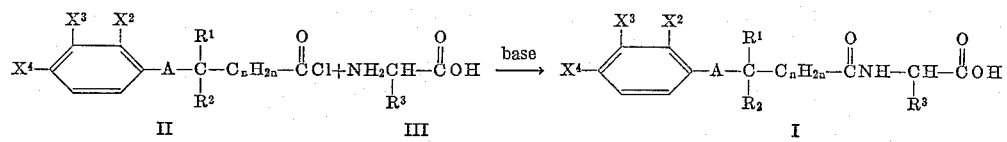

TABLE I

| Ex. | X² | X³ | X⁴ | A | R¹ | R² | R³ | CₙH₂ₙ |
|---|---|---|---|---|---|---|---|---|
| 4 | H | Cl | H | O | —CH₃ | —CH₃ | H | |
| 5 | H | H | Cl | O | —CH₃ | —CH₃ | —CH₃ | |
| 6 | H | H | —OCH₃ | O | —CH₃ | —CH₃ | H | |
| 7 | H | H | —O—CH₂—⟨⟩ | O | —CH₃ | —CH₃ | H | |
| 8 | H | H | Cl | O | H | H | H | —CH₂— |
| 9 | H | H | —C₂H₅ | O | —CH₃ | —CH₃ | H | |
| 10 | H | H | —NH—⟨⟩ | O | —CH₃ | —CH₃ | H | |
| 11 | Cl | H | H | O | —CH₃ | —CH₃ | H | |
| 12 | H | H | —⟨⟩ | O | —CH₃ | —CH₃ | H | |

TABLE I—Continued

| Ex. | X² | X³ | X⁴ | A | R¹ | R² | R³ | $C_nH_{2n}$ |
|---|---|---|---|---|---|---|---|---|
| 13 | H | H | (phenyl-S) | O | —CH₃ | —CH₃ | H | |
| 14 | H | H | —CH=CH—(phenyl) | O | —CH₃ | —CH₃ | H | |
| 15 | H | H | —CH₂—CH₂—(phenyl) | O | —CH₃ | —CH₃ | H | |
| 16 | H | Cl | H | O | —CH₃ | H | —C₃H₇ | |
| 17 | H | H | —NH—C(=O)—CH₃ | O | —CH₃ | —CH₃ | H | |
| 18 | H | H | —CH₂—C(=O)—(phenyl) | O | —CH₃ | —CH₃ | H | |
| 19 | H | H | Cl | NH | —CH₃ | —CH₃ | H | |
| 20 | H | H | Cl | O | H | H | H | |
| 21 | H | H | Cl | O | —CH₂—CH₂—CH₂—CH₂—CH₂— | | H | |
| 22 | H | H | Cl | O | H | —CH₃ | H | |
| 23 | H | H | Cl | O | —CH₃ | —C₂H₅ | H | |
| 24 | —SCH₃ | H | H | O | —CH₃ | —CH₃ | H | |
| 25 | H | H | Cl | O | H | H | H | —(CH₂)₂—CH(CH₃)— |
| 26 | H | H | Cl | O | H | H | H | —CH₂—CH(CH₃)— |
| 27 | H | H | Cl | O | H | —CH(CH₃)—CH₃ | H | |
| 28 | H | Cl | H | O | —CH₃ | H | H | |
| 29 | H | Cl | H | O | —C₂H₅ | H | H | |
| 30 | —CH₃ | H | Cl | O | —CH₃ | H | H | |
| 31 | H | H | —NO₂ | O | —CH₃ | —CH₃ | H | |
| 32 | H | H | Cl | O | H | —CH₃ | —C₂H₅ | |
| 33 | H | H | —SOCH₃ | O | —CH₃ | —CH₃ | H | |
| 34 | H | —CF₃ | H | O | —CH₃ | —CH₃ | H | |

One skilled in the art will appreciate that inasmuch as the N-carboxyalkyl-phenoxyalkanoic acid amides and N-carboxyalkyl-anilinoalkanoic acid amides of this invention may contain 1 or 2 asymmetric carbon atoms as, for example, when the R¹ and R² radicals in the compound depicted as I supra represent dissimilar radicals and R³ represents a substituent other than hydrogen, the said amides may be obtained as racemic mixtures comprising the dextro and levo forms of the compounds. These optical isomers may be resolved into their dextro and levo fractions by conventional methods.

What is claimed is:
1. A compound of the formula

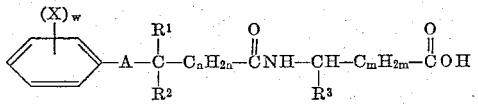

wherein A is a member selected from the group consisting of oxygen and imino, R¹ and R² each represents a member selected from the group consisting of hydrogen, lower alkyl, halo-lower alkyl and, taken together, may be joined to form a cycloalkyl ring containing from 5-6 nuclear carbon atoms, R³ is a member selected from the group consisting of hydrogen, lower alkyl, lower alkylthioalkyl and mononuclear aralkyl, X is a member selected from the group consisting of hydrogen, halogen, nitro, alkyl, cycloalkyl, alkenyl, alkoxy, lower alkylthio, lower alkylsulfonyl, aryl, aralkyl, aralkoxy, arylcarbonylmethyl, arylamino, lower alkanoic acid amido and, taken together, two of the X radicals on adjacent carbon atoms of the benzene nucleus may be joined to form a hydrocarbylene chain containing 3-4 carbon atoms between their points of attachment, $m$ represents an integer having a value of 0-3, $n$ represents an integer having a value of 0-4 and $w$ represents an integer having a value of 0-3.

2. A compound of the formula

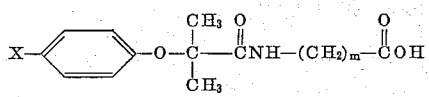

wherein X represents halogen and $m$ represents an integer having a value of 1-3.

3. A compound of the formula

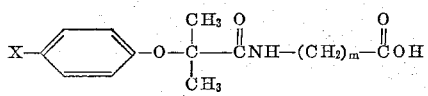

wherein X represents lower alkyl and $m$ represents an integer having a value of 1-3.

4. N-carboxymethyl-2-(4-chlorophenoxy)-2-methyl-propionamide.

5. N-ethoxycarbonylmethyl-2-(4-chlorophenoxy)-2-methylpropionamide.

6. N-[2-methyl-2-(4-chlorophenoxy)propionyl]-DL-methionine.

7. N-carboxymethyl-2-(4-chlorophenoxy)propionamide.

8. N-carboxymethyl-2-(-3-trifluoromethylphenoxy)isobutyramide.

References Cited

UNITED STATES PATENTS 3,043,868    7/1962    Krimmel _____ 260—518

LORRAINE A. WEINBERGER, *Primary Examiner.*

L. A. THAXTON, *Assistant Examiner.*